W. L. MONRO.
GLASS DRAWING POT TRUNNION.
APPLICATION FILED MAR. 20, 1911.
1,143,296.
Patented June 15, 1915.
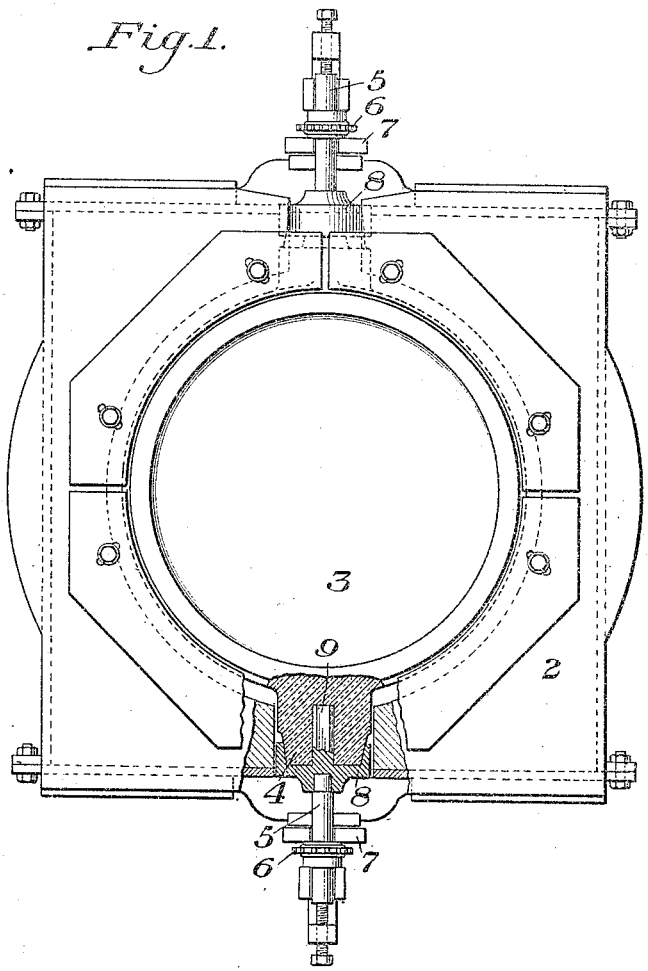
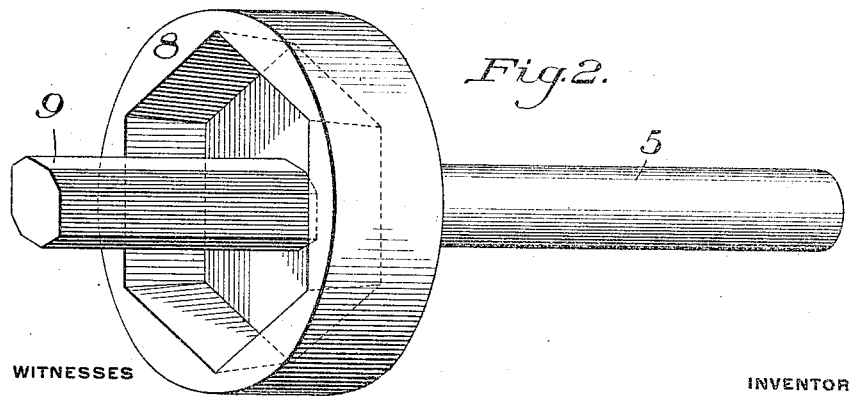
WITNESSES
R. H. Balderson
W. Famariss
INVENTOR
Wm. L. Monro,
by Bakewell, Byrnes Parmelee,
his Attys.

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

GLASS-DRAWING-POT TRUNNION.

1,143,296.  Specification of Letters Patent.  Patented June 15, 1915.

Application filed March 20, 1911. Serial No. 615,582.

*To all whom it may concern:*

Be it known that I, WILLIAM L. MONRO, a resident of Pittsburgh, in the county of Allegheny and State of Pennsylvania, have invented a new and useful Improvement in Glass-Drawing-Pot Trunnions, of which the following is a full, clear, and exact description, reference being had to the accompanying drawings, forming part of this specification, in which—

Figure 1 is a plan view partially broken away of a glass drawing pot embodying my invention; and Fig. 2 is a perspective view showing one of the trunnion members.

My invention has relation to glass drawing pots, and more particularly to reversible pots having trunnions upon which the pots are supported and turned.

Prior to my invention great difficulty has been experienced by reason of the trunnions of these pots burning away, after a comparatively short period of use by reason of the very considerable heat to which they are exposed.

My invention is designed to provide a trunnion member which will largely overcome this difficulty and greatly extend the life of the pots and trunnions.

The nature of my invention will be best understood by reference to the accompanying drawing, in which I have shown the preferred embodiment thereof and which will now be described, it being premised, however, that various changes may be made in the details of construction and arrangement of the parts, without departing from the spirit and scope of my invention as defined in the appended claims.

In the drawings, the numeral 2 designates the top-stone of a kiln, and 3 a reversible pot. This pot is formed with diametrically opposite sides, with the integral trunnion projections 4, which are shown as of hexagonal form in cross section, at their outer ends.

5 designates trunnion shafts which are provided with any usual or suitable operating gearing 6, and which are supported in bearings 7. These shafts carry the metal caps 8, which are shown as being of hexagonal form, to fit over the hexagonal portions of the trunnions 4. In practice, the shafts 5 are preferably cast into the hubs of these caps.

Heretofore, caps of this character have been provided with extended flanges, so as to engage and embrace a very considerable portion of the pot trunnions 4, necessitating a considerable trimming off of these trunnion portions and the flange being extended inwardly to a point where it is subjected to severe heat. This extended engagement between the caps and trunnion portions of the pot has been necessary in order to afford a secure connection between the caps and the pot. In accordance with my invention, the flanges of the caps are made relatively shallow, so as to engage only the outer end portions of one of the pot trunnions, and a secure connection is insured by providing the caps with an inward projection 9, extending into cavities in the pot trunnions. This projection may be of various forms. In the drawings, I have shown it as of hexagonal form, the cavity and the pot trunnion being of corresponding form.

By the provision of the projections 9, to afford a secure connection between the pot and the trunnion shafts, I am enabled to reduce the depth of the cap flanges in the manner before described, and actual practice has shown that my invention prolongs to a very great extent the actual life of the parts.

I claim:

1. A glass drawing pot having a non-metallic refractory trunnion, and a trunnion shaft having both interior and exterior actuating connection with the trunnion; substantially as described.

2. A glass drawing pot having a non-metallic refractory trunnion, and a trunnion shaft having both interior and exterior actuating connection with the trunnion, the interior actuating connection being formed by an inward, angular projection of the trunnion shaft, and the exterior connection being formed by engaging angular portions of the shaft and trunnion; substantially as described.

3. A glass drawing pot of non-metallic refractory material, an integral trunnion formed with an axial opening extending into its outer end, said opening being non-circular in cross section, and a trunnion shaft having a flange embracing the outer end portion of the trunnion, and also having an angular projection fitting said opening and forming a driving connection between the shaft and the trunnion; substantially as described.

4. The combination with a glass drawing pot having a trunnion of non-metallic refractory material, of a trunnion shaft having a relatively shallow flange fitting over the outer end of the trunnion and having angular driving engagement therewith, and said shaft having an axial extension within the trunnion and having an angular driving engagement therewith, said extension being of greater length than the said flange; substantially as described.

5. A trunnion shaft for glass drawing pots, comprising a shaft member formed with an enlarged flange having a polygonal internal peripheral wall, and an axial extension of angular cross section and of greater length than the flange; substantially as described.

In testimony whereof, I have hereunto set my hand.

WILLIAM L. MONRO.

Witnesses:
 ALICE A. TRILL,
 ROBT. J. WHALEN.